United States Patent [19]

Saindon et al.

[11] Patent Number: 5,587,032

[45] Date of Patent: Dec. 24, 1996

[54] METHOD AND APPARATUS FOR REGISTRATION OF A SEAL ON A PLASTIC BAG

[75] Inventors: Stephen A. Saindon, Appleton; Peter J. Gietman, Jr., Combined Locks; Nicholas J. Nagel, Oregon, all of Wis.

[73] Assignee: CMD Corporation, Appleton, Wis.

[21] Appl. No.: 289,426

[22] Filed: Aug. 12, 1994

Related U.S. Application Data

[63] Continuation-in-part of Ser. No. 228,566, Apr. 15, 1994, Pat. No. 5,518,559, which is a continuation-in-part of Ser. No. 105,434, Aug. 12, 1993, abandoned.

[51] Int. Cl.⁶ ..................................................... B32B 31/00
[52] U.S. Cl. ............................ 156/64; 156/353; 156/360; 156/361; 493/11; 493/24; 493/208
[58] Field of Search .............................. 156/64, 353, 360, 156/361, 362; 493/11, 24, 29, 187, 188, 202, 208

[56] References Cited

U.S. PATENT DOCUMENTS

| | | | |
|---|---|---|---|
| 3,360,416 | 12/1967 | Cochrane | 156/359 |
| 3,703,590 | 11/1972 | Höller et al. | 156/360 |
| 4,192,705 | 3/1980 | Wech . | |
| 4,216,705 | 8/1980 | Achelpohl et al. . | |
| 4,261,779 | 4/1981 | Wech . | |
| 4,380,446 | 4/1983 | Dickson et al. . | |
| 4,549,917 | 10/1985 | Jensen, Jr. . | |
| 4,618,391 | 10/1986 | Torti et al. . | |
| 4,642,084 | 2/1987 | Gietman, Jr. . | |
| 4,712,357 | 12/1987 | Crawford . | |
| 4,795,513 | 1/1989 | Jensen, Jr. . | |
| 4,934,993 | 6/1990 | Gietman, Jr. . | |
| 5,000,725 | 3/1991 | Bauknecht . | |
| 5,000,812 | 3/1991 | Murphy . | |
| 5,017,257 | 5/1991 | Murphy . | |
| 5,094,556 | 3/1992 | Kohler . | |
| 5,292,299 | 3/1994 | Anderson et al. . | |

FOREIGN PATENT DOCUMENTS 2-143845  1/1990  Japan .

*Primary Examiner*—David A. Simmons
*Assistant Examiner*—Paul M. Rivard

[57] ABSTRACT

A plastic bag making machine includes a cylindrical drum with a variable diameter. A plurality of seal bars define the circumference of the drum, and are substantially parallel to the drum's rotational axis. The bags are made from a plastic film with registration marks that are detected by a detector disposed near the film. A detector also detects each revolution of the drum and an encoder provides signals indicative of the position of the film. A controller determines the distance phase of the registration marks and the rum size error. The drum diameter is adjusted in response to an output of the controller in such a way as to correct for both the initial drum size error, the initial phase error, and the phase error accumulated while the drum diameter is being corrected.

19 Claims, 7 Drawing Sheets

METHOD AND APPARATUS FOR REGISTRATION OF A SEAL ON A PLASTIC BAG

RELATED APPLICATION

This application is a continuation-in-part of prior U.S. application Ser. No. 08/228,566, filed Apr. 15, 1994, entitled "Method And Apparatus For Registration Of A Seal On A Plastic Bag," now U.S. Pat. No. 5,518,559 which is a continuation-in-part of prior U.S. application Ser. No. 08/105,434, filed Aug. 12, 1993, entitled "Method And Apparatus For Registration Of A Seal On A Plastic Bag," now abandoned.

FIELD OF THE INVENTION

The invention relates generally to the art of plastic bag making machines. More specifically, the present invention relates to a bag machine which employs a rotary sealing drum. Still more specifically, the present invention relates to a bag machine in which the sealing drum is adjustable in size to produce different bags of different lengths.

BACKGROUND OF THE INVENTION

Many different types of plastic bag making machines are known in the art of producing plastic bags for industrial and individual consumers for many different applications (e.g. small sandwich bags and trash bags). While the present invention has a wide range of applications for the production of such products, the related art will be explained by reference to one particular class of bags i.e., polyethylene trash bags or, garbage bags and wastebasket liners of the type usually sold in boxes of folded bags or rolls of bags.

Further discussion of the history and operation of these machines can be found in U.S. Pat. No. 4,642,084 (the '084 patent) entitled "Plastic Bag Making Machine", issued to the present inventor on Feb. 10, 1987 and assigned to Custom Machinery Design, Inc. The '084 patent discloses a bag machine which includes a rotary drum with seal bars attached thereto and which includes a gear mechanism adapted for analog variation of the drum diameter between a first smaller diameter and a second larger diameter. Manual rotation of a hex nut assembly while the machine is stopped increases or decreases the drum's diameter through a series of appropriately mounted mitre gears and ring gears. Once this adjustment is made, the machine begins operation. Readjustment of the drum diameter can only be accomplished by stopping the machine to adjust the hex nut assembly.

Additionally, very small errors in drum diameter size can lead to acute problems, particularly an accumulating error in the seal to print registration distance every revolution of the drum. An error of a fraction of an inch leads to serious problems when the bag with is only several inches across and the speed of the film moving through the machine is 500–900 bags per minute. By the time the error is detected, a considerable amount of film is wasted.

The control of the spacial relationship between a repetitive print pattern on the web and the repetitive seals the machine is placing across the web is referred to as the "registration" of the seal to the print on the web. This spacial relationship may also be referred to as the "phase" between the repetitive print and seal occurrences on the web.

Similarly, the control of the spacial relationship between the repetitive seals placed across the web and the repetitive perforations the machine is placing across the web is referred to as the "registration" of the perforation to the seal on the web. This spacial relationship may also be referred to as the "phase" between the repetitive perforations and the repetitive seals across the web. The distance between a seal and a perforation is commonly called the "skirt length" of the finished bag.

Another prior art device described in U.S. Pat. No. 4,934,993 (the '993 patent), also issued to Gietman and assigned to the assignee of the present invention, allows for adjusting the drum diameter while the bag making machine is in operation. The '993 patent requires the operator to preset the drum diameter corresponding to the nominal bag length, but will correct for slight variations in the bag length. If the seal is not properly registered to the printing on the bag the diameter of the drum is temporarily increased or decreased. When the registration is correct the drum returns to the preset diameter. One disadvantage of this system is that "hunting" (the drum diameter will continually change) will occur if the average bag varies more than slightly from the preset length. Hunting will be particularly prevalent at higher speeds.

When a bag making machine such as that described in the '993 patent is used to adjust the drum diameter, any device (such as a perforator, die cutter, punching station, or folding station) on the bag making machine that processes the plastic downstream of the drum may become out of proper synchronization with the sealing process occurring in the drum while the drum is changing diameter. For example a perforator will be slightly out of synchronization causing perforation to seals registration (skirt length) to vary. According to the '993 patent the skirt length may be adjusted manually. However, by the time the error is detected and the manual correction made, a considerable amount of film may be wasted.

A bag making machine which overcomes these shortcomings would represent a considerable advancement in the art.

OBJECTS AND SUMMARY OF THE INVENTION

It is a primary object of the present invention to provide a plastic bag making machine which can adjust for different bag sizes without requiring the machine to be stopped and to adjust the registration of downstream process devices.

It is another object of the present invention to provide a plastic bag making machine which automatically compensates for errors in sizing of bags by adjusting its sealing apparatus to the bag size being produced without having to stop the machine.

According to the present invention a plastic bag making machine includes a cylindrical drum with a variable diameter. A plurality of seal bars define the circumference of the drum, and are substantially parallel to the drum's rotational axis. The bags are made from a plastic film that includes registration marks thereon. The marks are detected by a detector disposed near the film. A detector also detects each revolution of the drum. An encoder provides signals indicative of the position of the film. A controller determines the distance between the registration marks using the output of an encoder as a position signal and adjusts the diameter of the drum in response to the determined distance. The controller also determines the position of the seal bars relative to the registration marks and adjusts the diameter of the drum in response to the relative position. A downstream device includes a perforation to seal registration controller with a registration control input. The controller provides a control signal to the registration control input in response to changes in the diameter of the drum.

DESCRIPTION OF THE DRAWINGS

For a better understanding of the invention, reference is made to the accompanying drawings, in which like numerals designate corresponding elements or sections throughout, and in which.

Figure 1:
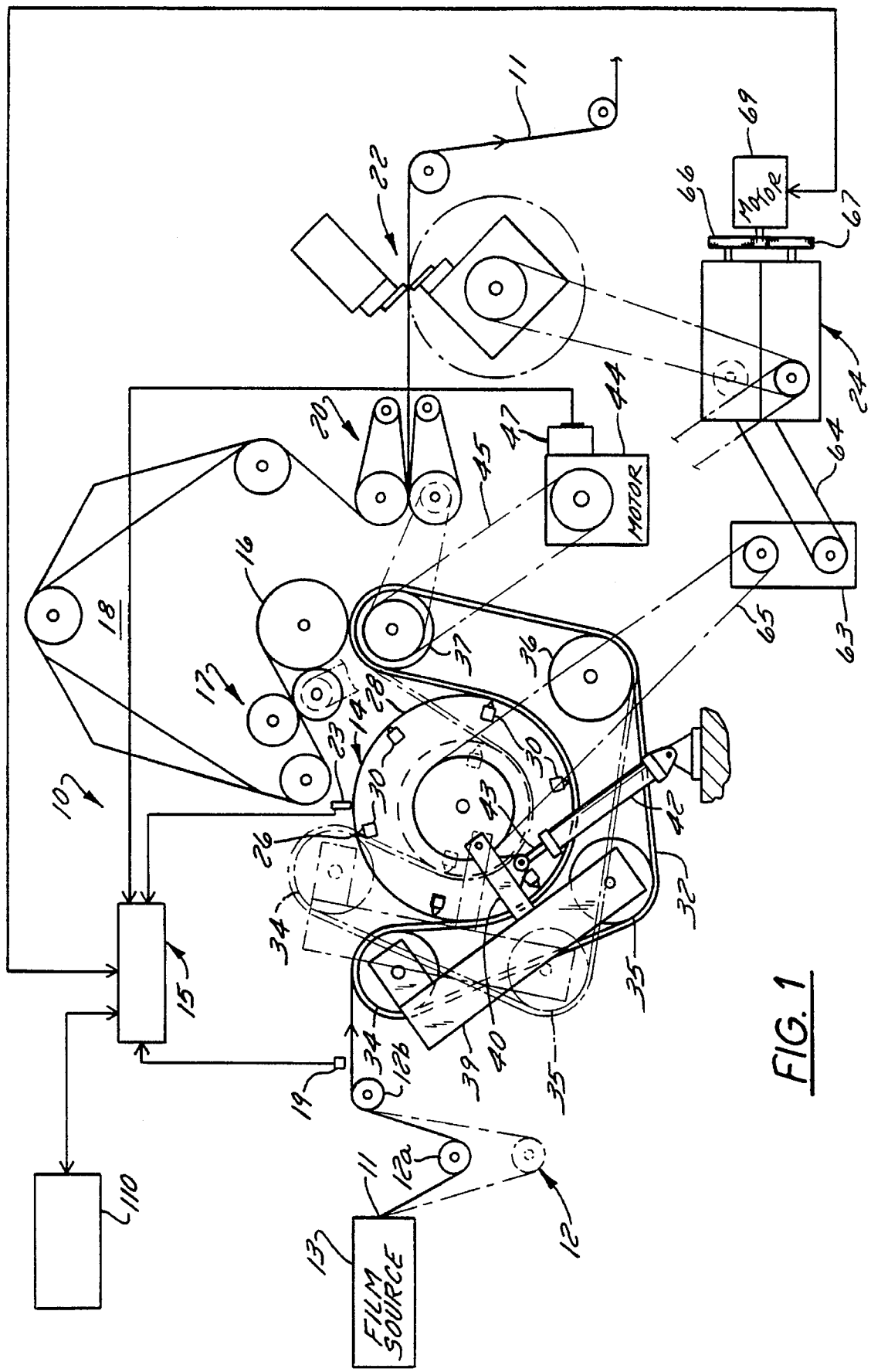
FIG. 1 is a schematic illustration of the bag making machine according to the preferred embodiment of the present invention.

To improve the clarity of the description of the major features of the present invention, only general descriptions are provided for components which are well known in the art, and could be variously embodied by one of ordinary skill in the art after reading and understanding the principles of the present invention, and/or are specifically described in the '084 and '993 patents.

DESCRIPTION OF THE PREFERRED EMBODIMENT

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The major elements of a bag making machine 10 include a dancer and idler assembly 12, a sealing drum and blanket assembly 14, a chill roll 16, a controller 15, a punching station 17, a folding station 18, a pull roll system 20, a perforator/cutting station 22 and a phase variator assembly 24. The present invention is primarily concerned with the sealing drum and blanket assembly 14, controller 15 and phase variator 24, or any other downstream device, as applied to plastic bag making machines and other machines in which a specific function is to be performed in a preselected spacing relationship to preprinted matter on pliable material.

The elements of the system shown in FIG. 1 may be configured in other ways, including removing elements shown therein. Likewise, the bag making machine 10 may have other elements added depending on the type of product being produced. For purposes of illustration, the basic system of the '084 patent will be used herein but should not be deemed limiting in any way. As noted above, this system can be employed in any mechanism wherein certain functions are to be performed in a specific spacing relationship to preprinted matter on a stream of pliable material.

Film 11 is fed in the direction of the arrows from a source of plastic tubing 13 through a dancer roll 12a and an idler roll 12b into the sealing drum and blanket assembly 14. Source 13 may be any source for printed plastic material such as an extruder, a preprinted roll of plastic film, or a printer on which the plastic is imprinted. Dancer roll 12a and idler roll 12b maintain proper tension and speed for the bag making system.

The sealing drum and blanket assembly 14 consists of a cylindrical drum 28, which is capable of being varied in diameter. That feature is illustrated in FIG. 1 by the dotted circle illustrating a smaller diameter. A number of sealing bars 30 are also shown in FIG. 1 and periodically form cross seals across the flattened film tube 11. Sealing bars 30 are of conventional design and are disclosed in detail with respect to construction and operation in the '084 patent. A blanket 32 is mounted on rollers 34, 35, 36 and 37 for surrounding a portion of drum 28 in such a way that the film 11 passes between blanket 32 and drum 28 while seals are being formed. Rollers 34 and 35 are mounted to an elongate frame 39 which is pivotable between the solid and dotted line positions shown in FIG. 1. Frame 39 includes a perpendicular plate 40 near its midsection, the latter being coupled to an air cylinder 42 having an extensible rod 43. It will be appreciated that extension of rod 43 causes rollers 34 and 35 to move to the dotted line position when the drum diameter decreases, thereby maintaining tension of blanket 32 against drum 28.

Roller 37 is driven from a gear motor 44 by belt 45 to drive blanket 32, and in turn blanket 32 will rotate drum 28 due to the tension between these components. Motor 44 includes an encoder 47 which generates a position signal each revolution of motor 44. Alternative encoder locations are on roller 37 or roller 36. A detector 23, such as an electric eye or magnetic sensor is positioned directly above drum 28 and generates a signal when a small metal or magnetic protrusion 26 on drum 28 passes, i.e. each revolution of drum 28. From the output of encoder 47 and detector 23 the circumference of drum 28 and the linear travel of film 11 are determined by controller 15. In an alternative embodiment encoder 47 may be mounted via a pulley to roller 37 or roller 36.

After passing chill roll 16, the film 11 next passes through an optional punching station 17 which punches preselected hole and handle configurations in the film. Thereafter, the film may be further processed as shown or in any other appropriate manner.

Variator system 24 is driven from a gear box 63 by belt 64. Gear box 63 is driven by drum 28 through belt 65. Variator system 24 also includes a pair of gears 66 and 67, used to vary the phase of the perforator/cutting station 22 and punching station 17, respectively, or any other type of downstream station. Adjustments to the perforation to seal phase arc made at the perforator/cutting station 22 by activating motor 69 which drives gears 66 and 67. As will be explained below, the phase may be automatically adjusted when the diameter of drum 28 is adjusted, in order to keep the skirt length appropriate. In an alternative embodiment the adjustment may be made by hand.

Figure 2:
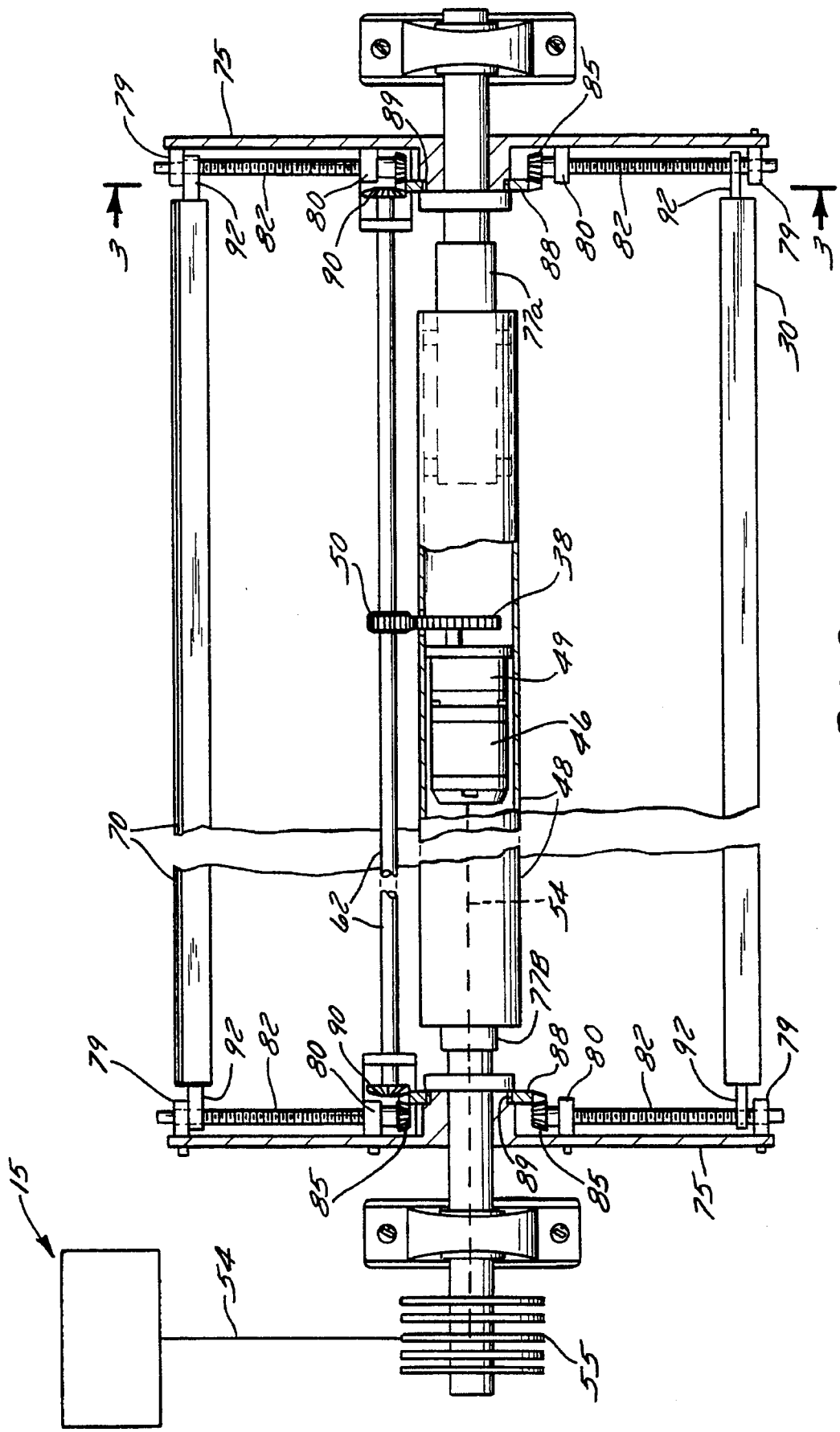
FIG. 2 is a longitudinal elevation (partially in section) of the expandable sealing drum according to the preferred embodiment of the present invention.
Figure 3:
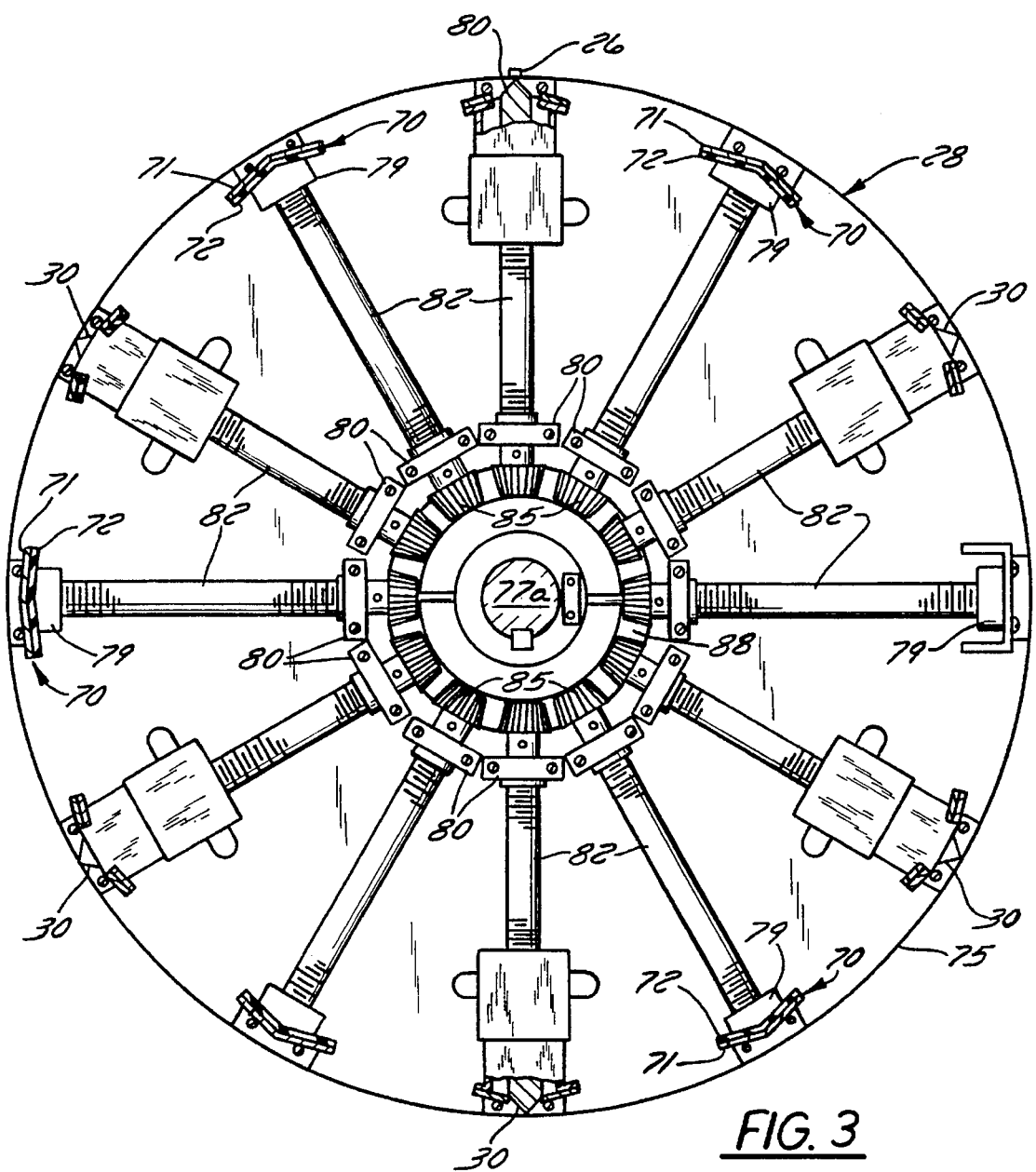
FIG. 3 is a cross-sectional view taken along the line 3—3 of FIG. 2.
Figure 4:
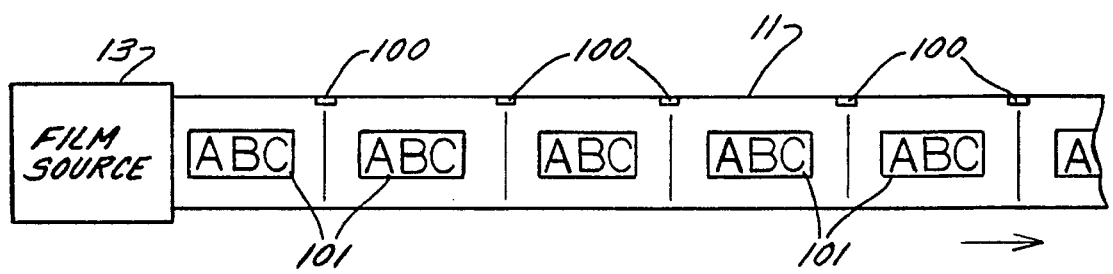
FIG. 4 is a perspective view of a length of printed plastic film as used in the preferred embodiment of the present invention.

Proceeding now to the more detailed description of the preferred embodiment of the present invention, reference is also made to FIGS. 2 and 3 to illustrate the expandable sealing drum 28. Drum 28 is generally cylindrical and is comprised of a plurality of elongate slats 70 and a plurality of scaling bars 30. Each slat 70 includes a steel base 72 having a slightly curved exterior surface. A rubber lagging 71 is provided on the exterior surfaces to assist in maintaining proper traction between blanket 32 and drum 28.

Drum 28 also has a pair of generally circular end plates 75 and axial shaft sections 77a and 77b extending through the center of drum 28 and mounted in suitable bearings to permit rotation of drum 28. Mounting plates 79 having holes therein are attached to the interior sides of each of end plates 75 near the outer edge thereof, the axis of the openings of each plate 79 being at 90° with respect to the axis of shaft sections 77a and 77b. Similar plates 80 are affixed to end plates 75 inwardly of plates 79 so that the pairs of spaced apart mounting plates (79 and 80) are disposed equidistantly around each end plate 75. In one embodiment 6 pairs of mounting plates are used. In a second embodiment 12 pairs, or a different number of mounting plates are used.

A threaded rod 82 is placed through the holes in each pair of plates 79 and 80. A mitre gear 85 is mounted on the inner end of rod 82. Rotation of mitre gear 85 causes rotation of rod 82.

A pair of mitre ring gears 88 are rotatably mounted to a machined surface of shaft sections 77a and 77b on bearings 89 and are constructed and arranged to mesh with mitre gears 85. Rotation of ring gears 88 causes rotation of all mitre gears 85 and threaded rods 82 which are coupled to each mitre gear ring 88.

Slats 70 are coupled to and supported by threaded rods 82 by a threaded plate 92 fastened to each end of slats 70. Rotation of the rods 82 will cause plates 92 to travel up and down the length of the rods. Rotation of a rod 82 in one direction will cause the slats 70 to move radially inward, reducing the drum diameter, while rotation in the opposite direction will cause a drum diameter expansion. In alternative embodiments supports other than threaded rods may be used, such as ball nuts and ball screws.

Rotation of rods 82 is accomplished by a motor 46 mounted in tube 48. Tube 48 is a hollow tubular section coaxially joining shaft sections 77a and 77b. Pinion 38 on gear box 49 is run by motor 46 and engages a gear 50 mounted on a rod 62. Rod 62 extends the length of drum 28 and pinion gears 90 at each end of rod 62 engage ring gears 88.

Rotation of pinion 38 by motor 46 causes rod 62 to rotate ring gear 88 and rods 82, thereby reducing or enlarging the diameter of drum 28. Motor 46 is energized by controller 15 through wires 54 which are connected to wires extending through shaft section 77b and tube 48 via slip rings 55.

In an alternative embodiment rod 62 may be replaced with a chain which directly drives one rod 82 at each end of drum 28. The chain driven rod 82 then drives ring gear 88, which in turn drives the remaining rods 82.

Controller 15 preferably includes a CPU (or any other digital logic device) and receives as inputs the outputs from a detector 19 and encoder 47. Controller 15 could alternatively include analog logic circuits or any other device that provides the proper outputs in response to the inputs. Detector 19 is an electric eye that detects a plurality of registration marks 100 on film 11, and is located above the path of film 11. A firmly mounted and flat surface provides a consistent optical background for detector 19 so that registration marks 100 on the film 11 can be read accurately. In an alternative embodiment the detector 19 may detect a distinguishing feature in the printed pattern rather than a specific mark for such purpose. And in a further alternative embodiment, the controller can ignore detection of printed matter on the web between specific selected features in the printed matter or between marks printed for the purpose of registration to the printed pattern.

While the operation of the bag machine of the present invention will be described with specific reference to the configuration of the '084 patent and a machine for producing plastic, it should be understood that the principles taught herein have numerous other applications. Therefore, application of the subject matter should not be limited just to plastic bag making machines.

Controller 15 includes an input from an operator interface 110, such as a VDT (video display terminal) and a keyboard. Operator interface 110 allows the operator to use one or more of a variety of features, such as, but not limited to, automatic nominal or average bag length detection, preset average or nominal bag length, automatic adjustment for variations in bag length, manual adjustment for variations in bag length, automatic phase control for skirt length and manual phase control for skirt length.

Initially, film 11 is fed in the direction of the arrows from film source 13 through the dancer and idler rolls to the blanket and drum assembly 14. As the film passes over the idler roll 12b, detector 19 reads the position of the registration mark 100 relative to the activated seal bars' position generated by detector 23, determined from the input from encoder 47. In the fully automated mode controller 15 can determine the nominal bag length (spacing between marks), as well as variations from the nominal bag length. Appropriate activation of motor 46 and adjustment to the drum size is then made, as well as the appropriate phase adjustment for controlling the seal to print registration. For example, if the seal bar position is progressively moving away upstream from the registration mark on the film, then the drum size is too large and motor 46 will be activated to decrease the drum diameter. When the seal bar holds its position relative to the registration mark 100, drum 28 is then set at the proper diameter.

At this point, seal bar spacing, as measured along the drum circumference, is equal to registration mark spacing, but the registration of the seal on the web with respect to the registration mark may not be correct. A shift may then be required to bring each seal and corresponding registration mark 100 into proper spacing. This is also accomplished with controller 15 through its automatic control of the drum size. Similarly, the perforator/cutting station 22 would also need adjustment to control the perforation to seal registration (skirt length).

In order to change the seal to registration mark spacing the drum size is altered temporarily to allow the registration mark 100 to "move" closer to the seal. As an example, if the registration mark needs to be moved closer to the seal, the drum size is altered to establish a known rate of advancement of the registration mark 100 toward the seal on each revolution of drum 28. When enough revolutions are completed, drum 28 is returned to its proper size and normal operation ensues. However, the temporary change in drum size to correct the seal to registration mark spacing will cause a temporary shift in the perforation to seal spacing (skirt length). Thus, the phase of perforator/cutter 22 is temporarily adjusted to maintain the skirt length at the desired value. The following example is illustrative of how this is accomplished, but is not in any way limiting on the use of the equipment or the components therein.

If the seal location with respect to the registration mark is six inches from the desired seal location with respect to the registration mark, the drum circumference may be reduced by ½ inch. Thus, after every revolution of drum 28, the registration mark is ½ inch closer to the seal. After 12 revolutions, the seal and registration mark will be properly spaced. Drum 28 is then expanded to the original circumference and normal operation of the machine may recommence.

While the proper drum diameter and seal to registration mark spacing are being obtained by controller 15 the skirt length needs to be temporarily adjusted. The perforator cutting station 22 is mechanically linked to drum 28. When the diameter of drum 28 is changed the speed of perforator cutting station 22 is simultaneously changed. However, there is a propagation delay while the bag at drum 28 travels along the film path until it reaches perforator cutting station 22. During this propagation delay the phase of the perforator/cutting station must be corrected to compensate for the instantaneous change in the speed of the perforator cutting station. Controller 15 provides the proper signal to motor 69 to temporarily compensate for the propagation delay at the time it sends the signal to adjust the diameter of drum 28.

Controller 15 also allows the presetting of the nominal bag length prior to threading film 11 through the machine. The operator can input the desired length, and controller 15 can cause the diameter of the drum to be adjusted until the preset diameter is obtained. Of course, the machine must be running in order to accomplish this.

In summary, controller 15 determines the spacing between print registration marks using inputs from detector 19 and encoder 47 determines the circumference of drum 28 using inputs from detector 23 and encoder 47. Controller 15 then calculates the arc length distance between active seal bars along the circumferential path of drum 28 and adjusts the drum circumference so that the arc length distance between active seal bars matches the distance between print registration marks. Controller 15 also measures the position of the seal bar relative to the print registration mark and automatically adjusts the relative placement of the seals in relationship to the print registration mark to a fixed distance, responding to changes in the print mark spacing on the printed web as they occur.

The location of a seal bar with respect to the print registration mark is determined by first counting encoder pulses from the time detector 19 detects a registration mark until the time detector 23 detects protrusion 26, located on the circumference of a drum end plate 75, in direct radial alignment with a seal bar location. Secondly, the distance from the detector 19 position along the web path to the lowest point on the drum circumference is known as a function of drum circumference. Using the encoder measurement, the known path length, and the known mark spacing, the actual and desired spacing between seal and registration mark can be calculated and compared.

During normal operation of the machine, plastic film 11 is fed from the roll 13 through the dancer roll 12a and idler roll 12b to the blanket and drum assembly 14 where heat seals are applied. The plastic film may be configured so that the seals define the bottoms of plastic bags being formed. Alternatively, the seals may define the sides of the bags. In this situation, the plastic film 11 is slit longitudinally down the middle, the middle slit being the top opening of each bag being formed.

Utilizing the drum sizing and the seal to registration mark registration functions of controller 15, seals may be consistently placed in proper orientation to any printed matter appearing on the film. As the film 11 leaves the blanket and drum assembly 14, it encounters chill roll 16 which cools the heat seals.

The plastic is next fed to punching station 17 where handles may be punched into or out of the plastic and the bag's configuration may be further defined. For example, "t-shirt" bags are quite popular in supermarkets and grocery stores at present. These bags have a lower bag section and two handles that resemble the shoulder straps of a tank top t-shirt. This configuration may be punched on the apparatus shown.

From punching station 17, the film may be fed to folding station 18 as disclosed in the '084 patent. From folding station 18 film 11 may next move to the perforator/cutting station 22 where perforations can be placed between bags or where the bags may be completely separated. As shown in the '084 patent, the separation between bags may also be partially slit, partially perforated. The bags then move on to a packaging operation.

In the preferred embodiment, punching station 17 and perforator/cutting station 22 and any other downstream devices are run off of the same gear box 63 connected to drum 28. As described above controller 15 causes adjustments to be made to variator system 24 so that there is no phase variance between seals, handle cuttings and perforation or cutting.

As an alternative embodiment, a separate servo motor is used to drive the perforator/cutting station 22 and a further separate servo motor is used to drive the punching station 17. In this embodiment, the controller maintains the relative speed and position of the two added servo motors to the rest of the machine using encoder feedback signals from each servo motor and a master encoder signal from an encoder connected either directly or indirectly via belt and pulleys to the drum shaft 111.

In a second alternative embodiment the variator system 24 may be composed of a special planetary gear box system known as a phase variator. As a third alternative embodiment, there may be two of these phase variator devices, one in the drive system to the punching station and one in the drive system to the perforation/cutting station. Thus, the punching station may also have a motor on its phase variator to allow the controller 15 to control punch to seal registration independently from perforation to seal registration.

Controller 15 serves one other function during operation of the machine. Through detectors 19 and 23, controller 15 continuously calculates averages of mark to mark spacing (bag length), seal to registration mark spacing (phase), and/or perforation to seal spacing (skirt length). These averages are used as filters to minimize control system "hunting" if widely varied sequential values are measured. The controller also detects and rejects erroneous readings and sends alarm signals to operators if readings vary too much or too frequently.

When the discrepancy reaches a preselected limit, controller 15 resets the nominal spacing and instructs motor 46 to make a minor adjustment in the size of drum 28 to compensate. The drum diameter may be slightly increased or decreased. This compensation function is continuous and ongoing so that the printed matter 101 is maintained in a consistent position on the bags.

The registration control scheme described first may be summarized as first adjusting the diameter of the drum to be appropriate for the actual bag length, and then temporarily adjusting the diameter to correct phase error. An alternative control provides for adjusting the drum diameter in such a way as to concurrently correct for both bag length and phase error.

To better understand this type of control, a more in depth analysis of the relationship between drum diameter, bag length, and phase error, as well as the changes to each over time is useful.

Drum error (or bag length error) may be defined as the desired drum circumference less the actual drum circumference, and may have either a positive or negative sign. An increase in the magnitude of the error does not change the sign (direction) of the error. Drum error does not change unless the drum diameter is changed.

Phase error, the distance between the desired and actual seal positions, also has a positive and negative sign. If the actual seal position is trailing the desired seal position, then the phase error is defined to be positive. If the actual seal position is leading the desired position, then the phase error is defined to be negative.

The phase error will change with each revolution unless the drum error is zero. For example, assuming there is a zero phase error and a non-zero drum error before the first drum revolution, a phase error dependent on the drum offset is added after one revolution. After two revolutions, there is two times the phase error, after three revolutions, three times the phase error, etc. A description of this is that the phase is "walking."

When the phase is walking the seal can move closer to the preceding or following desired seal location. Thus, what begins as a positive error may increase until it eventually becomes closer to the following seal position. At that time the error may be described as a negative error, and viewed as preceding the following desired seal location. This is much like an angle of +315 degrees being described as an angle of −45 degrees. For example, if the bag length is 80 inches, then:

| Measured Phase Error | Corrected Phase Error |
| --- | --- |
| +38 inches | +38 inches |
| +42 inches | −38 inches |
| −38 inches | −38 inches |
| −42 inches | +38 inches |

The phase error could be defined as always positive or always negative, but this would mean that the phase correction could be as large as a bag length. It is more efficient to limit the maximum phase error to be half of a bag length as is done above.

Figure 5:
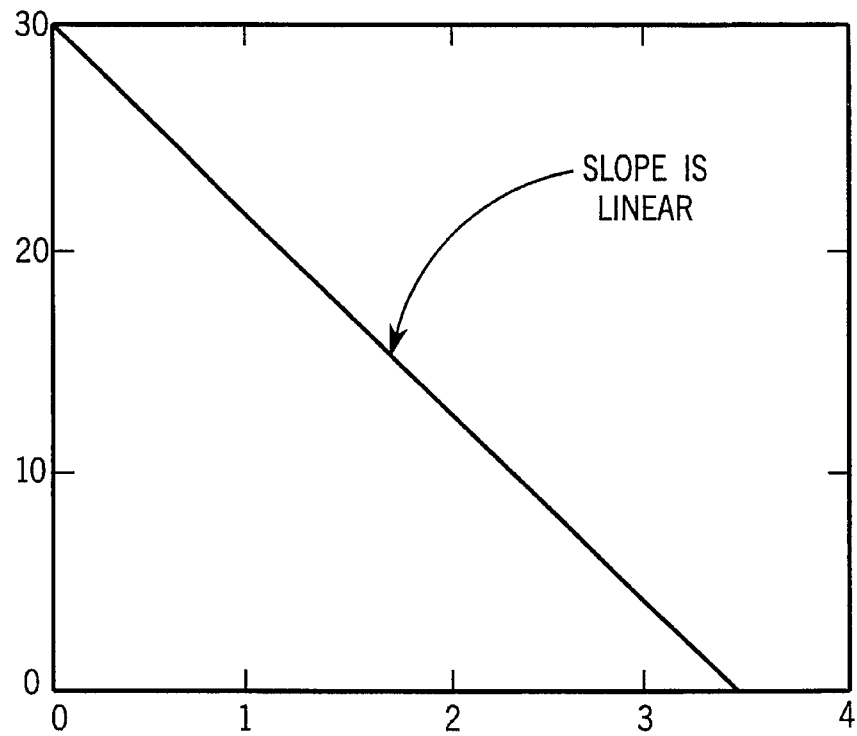
FIG. 5 is a graph showing drum error versus time.
Figure 6:
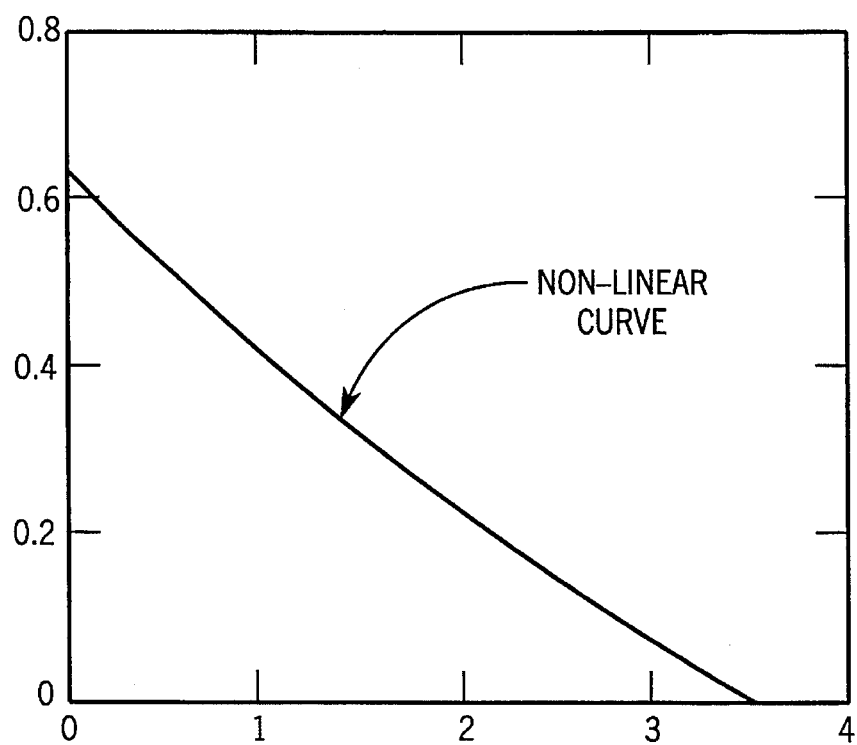
FIG. 6 is a graph showing phase rate versus time for the drum error of FIG. 5.
Figure 7:
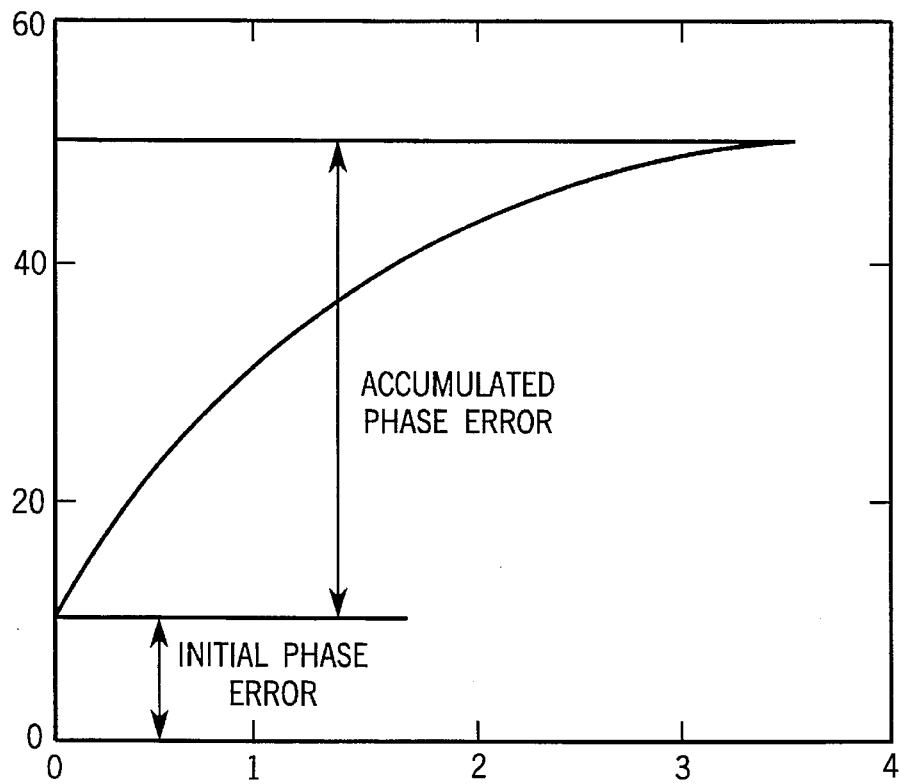
FIG. 7 is a graph showing phase error versus time for the drum error of FIG. 5.

The phase will walk even while drum adjustments are being made, unless the drum correction is completed prior to the next revolution (or the next seal bar if there are multiple seal bars per revolution). An example of the phase walking over a correction interval is demonstrated in FIGS. 5, 6, and 7. FIG. 5 shows the drum error as a function of time with an initial drum error of positive 30 inches. FIG. 6 shows the phase rate as a function of time for the drum error of FIG. 5. The phase rate is the rate at which the phase changes or walks and is also a function of drum circumference. Phase rate is defined as the drum error divided by the current drum circumference (and is then multiplied by line speed to convert from inches per inch to inches per second to convert to a time base). Since the actual drum circumference is changing over time, the drum error (which is the desired drum circumference minus the actual drum circumference) is also changing over time. Assuming that the desired drum circumference is constant over the correction interval, the phase rate is changing logarithmically. FIG. 7 shows the phase error as a function of time for an initial phase error of positive 10 inches and the drum error of FIG. 5.

FIGS. 5–7 show the time interval over which the drum error is eliminated, and assumes a constant rate of drum circumference change. FIGS. 5 and 6 show that as the drum error gets smaller, the phase rate decreases, and goes to zero when the drum error is zero.

Because the phase is walking when the correction is made the phase error at the end of the correction time will be the initial phase error plus the phase error added due to the phase walking. The added phase is actually the area under the phase rate curve (the accumulated phase error). Once the actual drum circumference is equal to the desired drum circumference, the drum error and the phase rate will both be zero, and the phase will no longer walk.

Given an initial drum error and an initial phase error, the objective of the controller of this alternative is to force these errors to be as close to zero as possible, and to drive them there somewhat concurrently. Since there are variations in raw materials, namely normal variation of the length of registration marks, the thickness of the film, etc., it is impossible to drive these errors to exactly zero. The controller must therefore maintain these errors to be within tolerance limits.

A control strategy that accomplishes this objective may be implemented with a controller that utilizes an algorithm which uses the initial drum error and the initial phase error as inputs and uses drum correction direction (increase or decrease drum circumference) and length of time for correction as outputs. This algorithm is computed in the controller, which then controls the drum circumference.

A drum correction motor is turned on for a specified length of time in response to the output of the controller. The controller can run the motor either forward or backward, which corresponds to increasing or decreasing the drum circumference. The time and direction are calculated by a control algorithm so that when the corrections have been completed the phase error and the drum error are both zero (or within specified tolerance limits). This is done by adjusting the drum so that the initial phase error plus the phase error added by the time it takes to correct the drum error is equal to the phase error incurred by the intentional offset.

Figure 8:
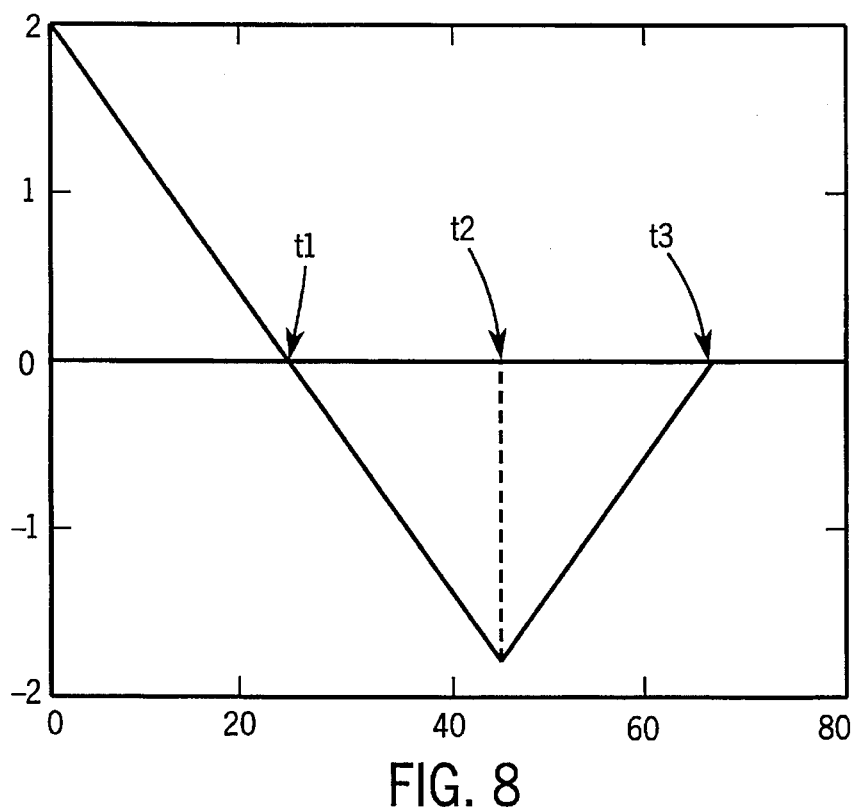
FIG. 8 is a graph showing drum error versus time.
Figure 9:
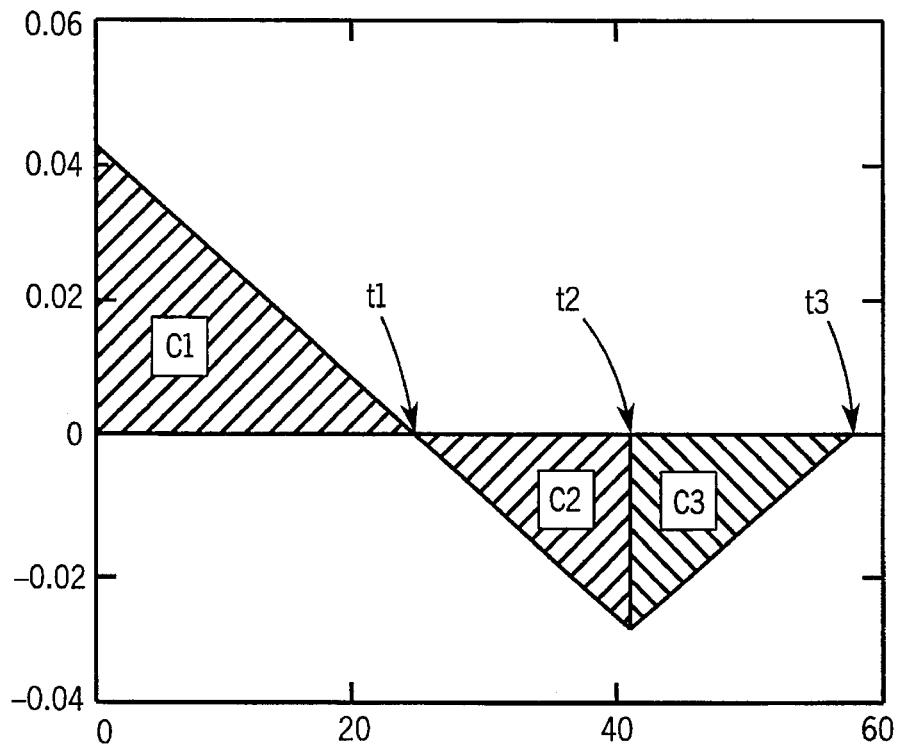
FIG. 9 is a graph showing phase rate versus time for the drum error of FIG. 8.
Figure 10:
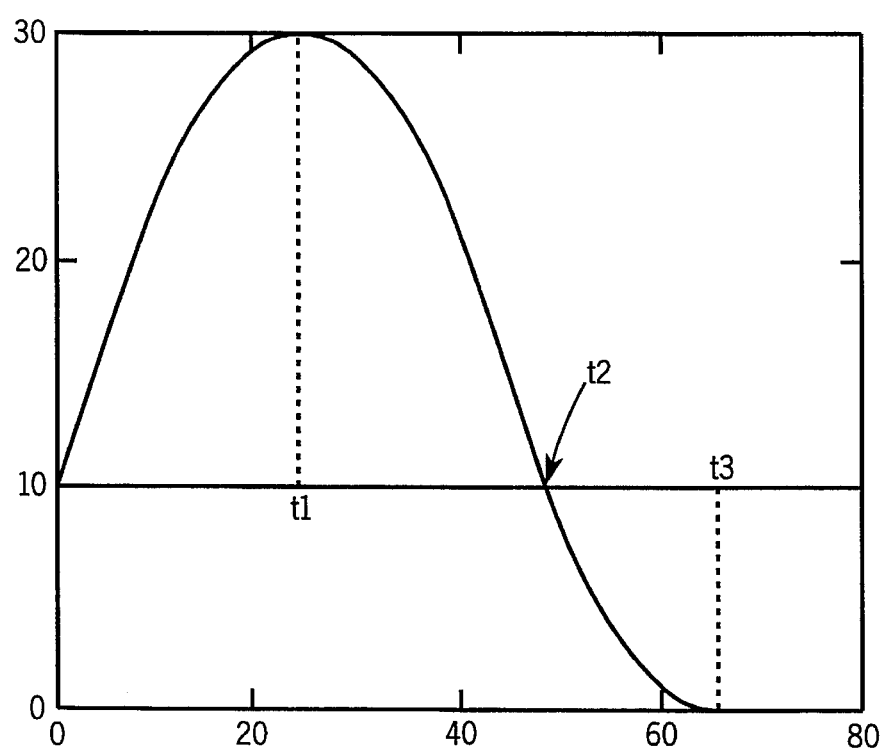
FIG. 10 is a graph showing phase error versus time for the drum error of FIG. 8.

FIGS. 8–10 illustrate this concept. FIG. 8 shows drum error as a function of time with an initial drum error of 2 inches. FIG. 9 shows the phase rate as a function of time for the drum error of FIG. 8, and FIG. 10 shows the phase error as a function of time for the drum error of FIG. 8.

In the example shown there is a positive drum error and a positive phase error. The time t1 in each graph is the time it takes to correct for the initial drum error. At time t1 the drum error is zero but the phase error has walked to a larger value than it had initially. The drum thus needs to continue to be increased and then decreased so that it will walk the phase error back to zero and it will return the drum error to zero. The drum is thus increased over the time interval from t1 to t2, and is then decreased over the time interval from t2 to t3 as shown in FIG. 8.

FIG. 9 shows the area under the phase rate curve for these time intervals. The area C1 is the amount of additional phase error that occurs just correcting for the initial drum error. Therefore, in accordance with the control strategy the area C2 and the area C3 is forced to be equal to the area C1 plus the initial phase error. The value of C2 and C3 is opposite in sign (negative in this case) to the value of C1 and the initial phase error.

The example illustrated in FIGS. 8–10 assumed that the drum error and phase error were both initially positive. The inventors have found that an effective control algorithm may be based on dividing the universe of initial conditions into the following six possible cases:

Case 1: positive drum error, positive phase error

Case 2: negative drum error, negative phase error

Case 3: positive drum error, negative phase error (area of |C1|>|phase errors|)

Case 4: negative drum error, positive phase error (area of |C1|>|phase error|)

Case 5: positive drum error, negative phase error (area of |C1|<|phase error|)

Case 6: negative drum error, positive phase error (area of |C1|<|phase error|)

Case 1 is described above in conjunction with FIGS. 8–10. Similarly, a negative initial drum error and initial phase error (case 2) would result in initially reducing the drum circumference beyond the desired drum circumference, and then returning it to its proper drum circumference. Both cases 1 and 2 result in the initial phase error increasing in magnitude as the drum is adjusted to its proper circumference. In other words, the drum error is of a polarity (sign) that causes the initial phase error to walk even farther from zero as the drum error is being corrected.

Figure 11:
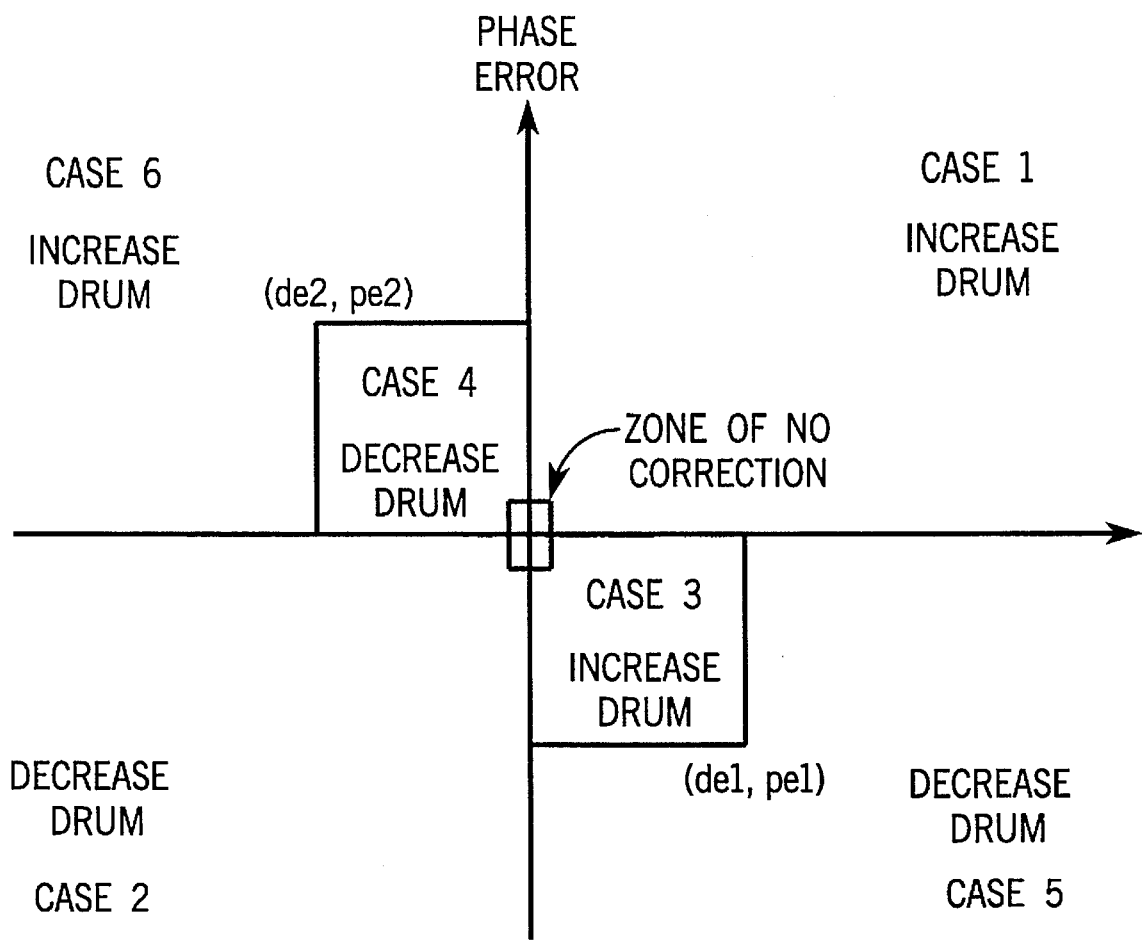
FIG. 11 is a graph different cases for a control algorithm used to implement the present invention.

The six cases are illustrated on the graph of FIG. 11. In FIG. 11, the horizontal axis shows drum error (positive to the right), and the vertical axis shows phase error (positive upwards). As may be seen on FIG. 11, cases 3–6 have initial drum errors such that the phase error accumulated while the drum error is being corrected has a polarity (sign) opposite that of the initial phase error.

For these cases, the area C1 is opposite in sign to that of the initial phase error. That is, the initial drum error is causing the initial phase error to walk closer to zero. In cases 3 and 4, the magnitude of C1 is greater than the magnitude of the initial phase error. This means that by the time the drum error is reduced to zero, the phase error will have walked past zero and continue to grow in the opposite direction that it started from. This means that the control action will be that of cases 1 and 2, namely, the drum will go past the desired drum circumference and then return.

In cases 5 and 6, the magnitude of C1 is less than the magnitude of the initial phase error. This means that the drum error is walking the phase error towards zero, but, at the time the drum error has been reduced to zero, the phase error has not yet reached zero. In these cases, the drum error can be left as is for a period of time to allow the phase error to walk toward zero before the drum error is corrected. The time the walking is allowed should be selected such that by the time the drum error is corrected to zero, the phase error is also corrected to zero. Another approach is to adjust the drum circumference so that the initial drum error is actually increased. This would also increase the phase rate and thus reduce the time that it takes to walk the phase error to zero.

FIG. 11 shows points (de1, pe1) and (de2, pe2) which correspond to the point at which the magnitude of C1 is equal to the magnitude of the initial phase error. There is one point for every drum error which has a value of phase error which corresponds to this point. At this point, the time it takes to adjust the drum circumference to its desired value is equal to the time it takes to walk the phase to zero error. Therefore, only the correction interval t1 would be needed.

FIG. 11 also shows a zone of no correction. This represents the fact that the drum error and phase error never actually be zero, and therefore tolerance limits must be set. If the drum error is within 0.030 inches and the phase is within 0.100 inches, no corrective action is taken. These numbers are purely illustrative and should not be considered critical or limiting.

According to another alternative embodiment, when the drum error is large initially, the drum error is reduced to a predetermined limit before concurrent or simultaneous drum error and phase error corrections are made. One such limit that has been found to be acceptable empirically is 2 inches. There are two reasons simultaneous drum error and phase error adjustments with large initial drum errors are avoided. First, the time to make both changes simultaneously is much greater than first getting the drum within this limit and then doing both changes simultaneously. Second, for large drum errors the phase error will walk too far during the correction period, and can even walk across the entire bag length multiple times.

One implementation of an algorithm that satisfies the above described control scheme, using a linear phase rate assumption, involves the solution of a quadratic equation to derive the time that the drum correction motor should be on for. The solution of this quadratic yields a complex number. The magnitude of the complex number is used for the time and the direction in which the correction motor is run is determined by the initial drum and phase error. If the initial drum error is opposite in sign of the initial phase error, then the direction of drum correction is determined by the magnitude of C1 relative to the initial phase error.

As one skilled in the art will readily recognize, many control equations will satisfy the concerns addressed above, and come within the scope of the present invention. One such equation that is acceptable has been developed by the applicants, and is given below. The equation and is merely illustrative, and should not be construed as limiting the scope of this invention.

In the equations below $T_1$ is the time it takes to initially drive the drum error to zero (t1 on FIGS. 8–10) and $T_2$ is the time from when the drum rate error is zero until the drum motor direction is reversed (t2–t1 on FIGS. 8–10). $T_{tot}$ is the total correction time. For the following equations it is assumed that $T_2$ occurs midway between $T_1$ and $T_{tot}$.

$$T_1 = \frac{\text{drum\_set} - \text{drumcirc}_0}{\text{drumrate}}$$

$$T_2 = \left[ \begin{array}{c} \frac{-1}{2 \cdot s \cdot \text{drumrate} \cdot IPS} \cdot (k \cdot s \cdot \text{drumrate} + \sqrt{k^2 \cdot s^2 \cdot \text{drumrate}^2 - 4 \cdot k \cdot s} \\ \frac{-1}{2 \cdot s \cdot \text{drumrate} \cdot IPS} \cdot (k \cdot s \cdot \text{drumrate} + \sqrt{k^2 \cdot s^2 \cdot \text{drumrate}^2 - 4 \cdot k \cdot s} \end{array} \right.$$

and $$T_{tot} = s \cdot T_1 + 2 \cdot T_2$$

where:

drumcirc=measured circumference of drum $drumcirc_0$ =initial circumference of drum drumrate=rate at which drum circumference changes drum_set=desired circumference of drum s=+/−1 depending on the direction of the correction k=initial phase error + phase error accumulated during correction time $T_1$ drum_err=drum circumference error (drum_set-drumcirc)

drum_$err_0$=initial drum error phaserate=rate at which phase is changing

IPS=line speed

In the above embodiments the time that the fixed Speed drum diameter motor is turned on is varied in response to the phase error and drum size error. In another embodiment, in addition to or instead of controlling the on time of the motor, the motor speed is varied in response to the phase error and drum size error.

While one preferred embodiment of the present invention is shown in the Figures and described in detail herein, modifications and variations could be developed by one of ordinary skill in the art after the objects of the invention are understood. For example, in any operation in which a specific function such as perforation or punching needs to be performed on a continuous stream of pliable material (e.g., paper or cloth) having printed matter thereon, in a preselected spacing relation, this system can easily be adapted to perform efficiently and easily. Accordingly, the present invention is not to be limited to the specifically disclosed preferred embodiment, but rather only by the scope of the claims which follow.

We claim:

1. An apparatus for making plastic bags from plastic film having a plurality of registration marks comprising:

a cylindrical drum with a variable diameter, a circumference, an axis and at least one seal bar substantially parallel to the axis and defining the circumference, wherein the at least one seal bar seals the plastic bags;

a sensor disposed to detect the rotation of the drum;

a registration mark detector disposed to detect the registration marks;

an encoder;

means for determining the nominal length of the bags from the detection of the registration marks and the rotation of the drum;

seal phase means for determining a phase of the registration mark relative to the seal on the plastic bag; and means for adjusting the diameter of the drum in response to the nominal bag length and the phase of the registration mark relative to the seal on the plastic bag such that a circumferential distance between subsequent seal bars is changed in a first direction to be substantially equal to the nominal bag length, and for continued adjusting Of the diameter of the drum in the first direction such that the circumferential distance between subsequent seal bars is not substantially equal to the nominal bag length.

2. The apparatus of claim 1 wherein the means for adjusting further adjusts the diameter of the drum such that the phase is adjusted to substantially zero and a circumferential distance between subsequent seal bars is substantially equal to the nominal bag length.

3. The apparatus of claim 1 wherein the means for adjusting further adjusts the diameter of the drum for a time $T_1$, in accordance with the formula $$T_1 = \frac{\text{drum\_set} - \text{drumcirc}_0}{\text{drumrate}}$$

where:

drum_set=desired circumference of drum $drumcirc_0$ =initial circumference of drum drumrate=rate at which drum circumference changes such that a circumferential distance between subsequent seal bars is changed in a first direction to be substantially equal to the nominal bag length.

4. The apparatus of claim 3 wherein the means for adjusting adjusts the diameter of the drum for a time $T_2$ in accordance with the formula $$T_2 = \left[ \begin{array}{c} \frac{-1}{2 \cdot s \cdot \text{drumrate} \cdot IPS} \cdot (k \cdot s \cdot \text{drumrate} + \sqrt{k^2 \cdot s^2 \cdot \text{drumrate}^2 - 4 \cdot k \cdot s} \\ \frac{-1}{2 \cdot s \cdot \text{drumrate} \cdot IPS} \cdot (k \cdot s \cdot \text{drumrate} + \sqrt{k^2 \cdot s^2 \cdot \text{drumrate}^2 - 4 \cdot k \cdot s} \end{array} \right.$$

where:

drumcirc=measured circumference of drum s indicates the direction of change k=initial phase error+phase error accumulated during correction time $T_1$ drum_err=drum circumference error (drum_set-drumcirc)

IPS=line speed.

5. The apparatus of claim 1 wherein the means for adjusting readjusts the diameter of the drum in a second direction opposite the first direction such that the circumferential distance between subsequent seal bars is substantially equal to the nominal bag length and the phase is adjusted to substantially zero.

6. The apparatus of claim 4 wherein the means for adjusting readjusts the diameter of the drum in a second direction opposite the first direction for the time $T_2$ such that the circumferential distance between subsequent seal bars is substantially equal to the nominal bag length and the phase is adjusted to substantially zero.

7. A method for making plastic bags from plastic film having a plurality of registration marks using a bag making machine having a cylindrical drum with a variable diameter, a circumference, an axis and at least one seal bar substantially parallel to the axis and defining the circumference, comprising, detecting the rotation of the drum;

detecting the registration marks on the film;

determining the nominal length of the bags from the detection of the registration marks and the rotation of the drum;

determining a phase of the registration mark relative to a seal on the plastic bag;

adjusting the diameter of the drum in a first direction in response to the nominal bag length and the phase of the registration mark relative to the seal on the plastic bag such that a circumferential distance between subsequent seal bars is changed in a first direction to be substantially equal to the nominal bag length; and continued adjusting of the diameter of the drum in the first direction such that the circumferential distance between subsequent seal bars is not substantially equal to the nominal bag length.

8. The method of claim 7 including the step of adjusting the diameter of the drum such that the phase is adjusted to substantially zero and a circumferential distance between subsequent seal bars is substantially equal to the nominal bag length.

9. The method of claim 7 wherein the step of adjusting the diameter of the drum is performed for a time $T_1$ in accordance with the formula $$T_1 = \frac{\text{drum\_set} - \text{drumcirc}_0}{\text{drumrate}}$$

where:

drum_set=desired circumference of drum drumcirc$_0$ =initial circumference of drum drumrate=rate at which drum circumference changes such that a circumferential distance between subsequent seal bars is changed in a first direction to be substantially equal to the nominal bag length.

10. The method of claim 9 wherein the step of continued adjusting of the diameter of the drum is performed for a time $T_2$ in accordance with the formula $$T_2 = \begin{bmatrix} \frac{-1}{2 \cdot s \cdot \text{drumrate} \cdot IPS} \cdot (k \cdot s \cdot \text{drumrate} + \sqrt{k^2 \cdot s^2 \cdot \text{drumrate}^2 - 4 \cdot k \cdot s} \\ \frac{-1}{2 \cdot s \cdot \text{drumrate} \cdot IPS} \cdot (k \cdot s \cdot \text{drumrate} + \sqrt{k^2 \cdot s^2 \cdot \text{drumrate}^2 - 4 \cdot k \cdot s} \end{bmatrix}$$

where drumcirc=measured circumference of drum s indicates the direction of change k=initial phase error+phase error accumulated during correction time $T_1$ drum_err =drum circumference error (drum_set-drumcirc)

IPS=line speed.

11. The method of claim 7 further including the step of readjusting of the diameter of the drum in a second direction opposite the first direction such that the circumferential distance between subsequent seal bars is returned to substantially equal to the nominal bag length and the phase is adjusted to substantially zero.

12. The method of claim 10 wherein the step of readjusting the diameter of the drum in a second direction opposite the first direction is performed for the time $T_2$ such that the circumferential distance between subsequent seal bars is substantially equal to the nominal bag length and the phase is adjusted to substantially zero.

13. An apparatus for making plastic bags from plastic film having a plurality of registration marks comprising:

a cylindrical drum with a variable diameter, a circumference, an axis and at least one seal bar substantially parallel to the axis and defining the circumference, wherein the at least one seal bar seals the plastic bags;

a sensor disposed to detect the rotation of the drum;

a registration mark detector disposed to detect the registration marks;

a controller, connected to receive a first input from the sensor and a second input from the detector, wherein the controller has a first signal indicative of the nominal length of the bags;

further wherein the controller has a second signal indicative of a phase of the registration mark relative to the seal on the plastic bag;

further wherein the controller has at least one output having a magnitude responsive to the first and second signals; and a motor connected to the drum and responsive to the at least one output, wherein the diameter of the drum is adjusted in response to the at least one output such that a circumferential distance between subsequent seal bars is changed in a first direction to be substantially equal to the nominal bag length, and further such that the diameter of the drum is continued to be adjusted in the first direction such that the circumferential distance between subsequent seal bars is not substantially equal to the nominal bag length.

14. The apparatus of claim 13 wherein the controller includes means for continued adjusting the diameter of the drum such that the phase is adjusted to substantially zero and a circumferential distance between subsequent seal bars is substantially equal to the nominal bag length.

15. The apparatus of claim 13 wherein the controller includes means for adjusting the diameter of the drum in the first direction for a time $T_1$ in accordance with the formula $$T_1 = \frac{\text{drum\_set} - \text{drumcirc}_0}{\text{drumrate}}$$

where:

drum_set=desired circumference of drum drumcirc$_0$=initial circumference of drum drumrate=rate at which drum circumference changes such that a circumferential distance between subsequent seal bars is changed in a first direction to be substantially equal to the nominal bag length.

16. The apparatus of claim 15 wherein the means for adjusting further includes means for continued adjusting of the diameter of the drum in the first direction for a time $T_2$ after the circumferential distance between subsequent seal bars is substantially equal to the nominal bag length in accordance with the formulas $$T_2 = \left[ \frac{-1}{2 \cdot s \cdot \text{drumrate} \cdot IPS} \cdot (k \cdot s \cdot \text{drumrate} + \sqrt{k^2 \cdot s^2 \cdot \text{drumrate}^2 - 4 \cdot k \cdot s \cdot} \right.$$
$$\frac{-1}{2 \cdot s \cdot \text{drumrate} \cdot IPS} \cdot (k \cdot s \cdot \text{drumrate} + \sqrt{k^2 \cdot s^2 \cdot \text{drumrate}^2 - 4 \cdot k \cdot s \cdot}$$

where:

drumcirc=measured circumference of drum s indicates the direction of change k=initial phase error+phase error accumulated during correction time $T_1$ drum_err=drum circumference error (drum_set-drumcirc)

IPS=line speed.

17. The apparatus of claim 15 wherein the means for adjusting further includes means for readjusting of the diameter of the drum in a second direction opposite the first direction such that the circumferential distance between subsequent seal bars is substantially equal to the nominal bag length and the phase is adjusted to substantially zero.

18. The apparatus of claim 16 wherein the means for adjusting further includes means for readjusting of the diameter of the drum in a second direction opposite the first direction for the time $T_2$ such that the circumferential distance between subsequent seal bars is substantially equal to the nominal bag length and the phase is adjusted to substantially zero.

19. The apparatus of claim 13 wherein the controller includes means for adjusting the diameter of the drum in a first direction such that the phase is adjusted to substantially zero and a circumferential distance between subsequent seal bars is substantially equal to the nominal bag length.

* * * * *